Dec. 26, 1944.  D. R. SHOULTS  2,365,991
AIRCRAFT TURBINE SUPERCHARGER
Filed Feb. 14, 1942
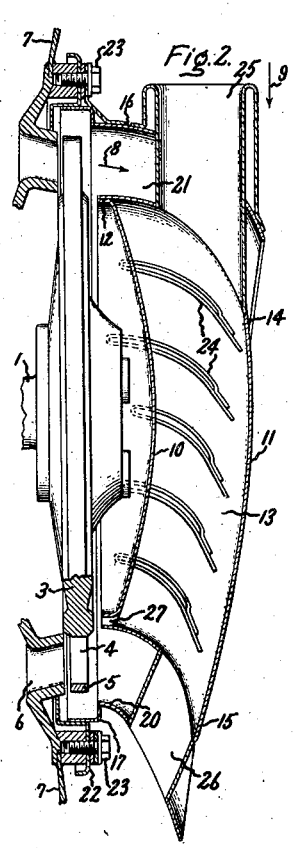
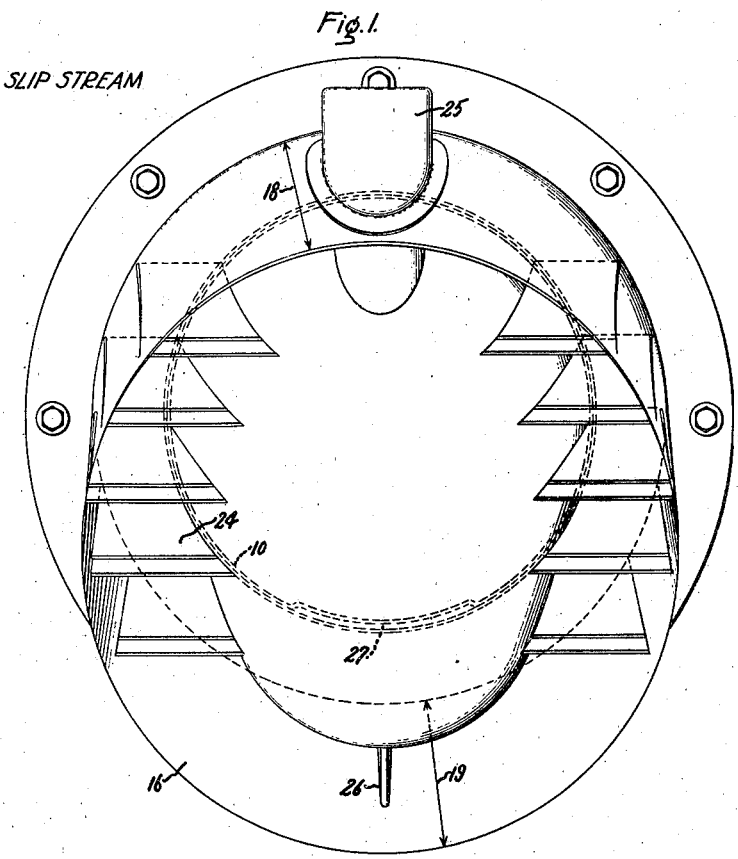
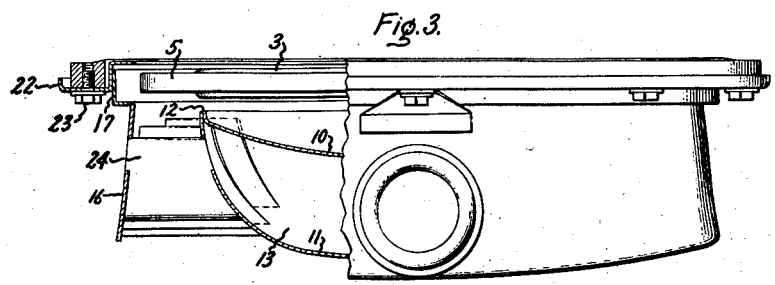
Inventor:
David R. Shoults,
by Harry E. Dunham
His Attorney.

Patented Dec. 26, 1944

2,365,991

UNITED STATES PATENT OFFICE 2,365,991

AIRCRAFT TURBINE SUPERCHARGER

David R. Shoults, Schenectady, N. Y., assignor to General Electric Company, a corporation of New York Application February 14, 1942, Serial No. 430,881

3 Claims. (Cl. 60—41)

The present invention relates to aircraft turbine superchargers of the exhaust gas driven type wherein the exhaust gases are discharged from the turbine buckets directly to atmosphere, and especially to such superchargers when arranged in the aircraft with the axis of the turbine wheel at right angles to the slip stream of the aircraft, although it is not limited thereto necessarily. With such an arrangement, the slip stream flows transversely of the turbine wheel and tends to force gases issuing from the buckets on the upstream side of the wheel toward the central portion thereof, thus causing heating of the wheel. Also, after-burning of the gases issuing from the turbine wheel may occur.

One object of the present invention is to provide an improved construction and arrangement for protecting the turbine wheel from the hot exhaust gases, which effects a smooth and even turning of the gases after they leave the wheel into the slip stream, and which interferes to a minimum with the radiation of heat from the turbine buckets.

A further object of the invention is to provide means whereby the parts which serve to direct the hot exhaust gases from the buckets into the slip stream are cooled by air from the slip stream.

A further object of my invention is to provide an improved arrangement for accomplishing the foregoing which is simple in structure, efficient in operation and light in weight.

For a consideration of what I believe to be novel and my invention, attention is directed to the following specification and the claims appended thereto.

In the drawing, Fig. 1 is a face view of a structure embodying my invention; Fig. 2 is a vertical sectional view thereof; and Fig. 3 is a top plan view partly in section.

Referring to the drawing, I indicates the shaft of a supercharger which is carried in a suitable bearing (not shown) and has overhung on its end a turbine wheel comprising a central disk 3 on the periphery of which is a ring of buckets 4 having at their outer ends a shroud band 5. Gases from the engine or from other source of supply are directed against the buckets by nozzles 6 which form a part of a nozzle box 7. The exhaust gases are supplied to the nozzle box through a suitable conduit (not shown) connected with a source of supply such as, for example, the exhaust manifold of an internal combustion engine. Only sufficient of the supercharger has been illustrated as is required for an understanding of my invention. It is to be taken as typical of any suitable gas driven turbine construction.

The gas is discharged from the turbine wheel in the direction indicated by arrows 8 in Fig. 2. The direction of the slip stream is indicated by the arrow 9 in Fig. 2.

According to my invention, I provide protecting means for the turbine wheel, termed usually a cooling cap or flighthood, comprising two dished disk-shaped walls 10 and 11 joined along their edges as is indicated at 12 and spaced apart sufficiently to define a cooling air chamber 13 of the desired size. Inner wall 10 is of a diameter equal substantially to that of the turbine wheel disk 3. Outer wall 11 is curved downward at its upper or upstream portion as is indicated at 14 and depends downward somewhat beyond wall 10 as is indicated at 15. It provides a smoothly curved surface over which gases discharged from the upstream or top side of the turbine may flow. Surrounding walls 10 and 11 in spaced relation thereto is a downwardly curved cylindrical wall 16 provided with an annular U-shaped flange 17. The axial depth of cylindrical wall 16 at its upper end is indicated by line 18 (Fig. 1) and at its lower end by line 19 (Fig. 1). Cylindrical wall 16 at its inner edge 20 has a diameter slightly greater than that of the turbine wheel and forms with wall 11 a downwardly curved annular passage 21 through which gases discharged from the turbine wheel flow into the slip stream.

Referring particularly to Fig. 1, it will be seen that cylindrical wall 16 is of relatively small axial depth, it being of substantially uniform axial depth throughout its circumference, and that it covers only a minor portion of the bucket ring, the major portion being uncovered whereby gases from such major portion are discharged directly to atmosphere and heat from such major portion may radiate directly to atmosphere.

Flange 17 is fastened to the nozzle box by a second flange 22 which is fixed to the nozzle box by a ring of bolts 23.

Extending across annular passage 21 between walls 15 and 16 are a plurality of exhaust gas directing and cooling vanes 24 which, as best shown in Fig. 2, are curved downwardly to turn the exhaust gases issuing from the turbine buckets and direct them into the slip stream. Vanes 24 are attached to walls 15 and 16 preferably by welding. They are hollow and the hollow spaces communicate at one end with air chamber 13 and at the other end with the outer side of wall 16, i. e., directly with the atmosphere.

Connected with cooling air chamber 13 at its upper or upstream side is an inlet pipe or ram 25 which faces in the direction of the slip stream and serves to convey air from the atmosphere to chamber 13. At the lower or downstream side of chamber 13 is a narrow air discharge conduit 26. Also, at their lower or downstream sides, walls 10 and 11 are shaped to provide a narrow elongated slot 27 for discharge of air against the rim of the turbine wheel disk for cooling it.

Vanes 24 and conduits 25 and 26 serve to hold cylindrical wall 16 and walls 11 and 12 in assembled relation, the structure as a whole being supported, at least in part, from the nozzle box by the ring of bolts 23.

In operation, gases issuing from the buckets of the turbine wheel are turned by the upstream portion of wall 10 and by vanes 24 and are directed across the wheel and into the slip stream. This serves to effect a gradual turning of the gases and their smooth even flow into the slip stream. Thus the flow of the exhaust gases into the slip stream interferes to a minimum with the distribution of the slip stream air flow over the turbo-supercharger installation.

The flighthood comprising walls 10 and 11 serves to prevent exhaust gases coming into direct contact with wheel disk 3 and to prevent any after-burning adjacent to the wheel. Cooling air enters chamber 13 through conduit 25 and flows outwardly through hollow vanes 24 to cool the vanes. Also air flows through slot 27 against the rim of the web to cool it and the buckets. The cooling air also absorbs heat from the wheel through wall 10 and carries it away.

By my invention, I provide an improved construction which is light in weight, which effectively protects the wheel from the hot exhaust gases, which prevents after-burning adjacent to the wheel and which functions to cool the wheel in a satisfactory manner.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a gas turbine wheel comprising a disk with buckets thereon, of cooling and protecting means therefor comprising spaced walls which form a shield for the disk of the wheel and provide a cooling air chamber, a cylindrical wall which surrounds the first-named walls in spaced relation thereto to provide a discharge passage for gases issuing from the turbine wheel buckets, gas directing vanes in said discharge passage having transverse passages which communicate with said cooling air chamber, and means for effecting flow of cooling air through said cooling air chamber and said transverse passages.

2. The combination with a gas turbine wheel comprising a disk with buckets thereon, of cooling and protecting means therefor comprising spaced walls which form a shield for the disk of the wheel and provide a cooling air chamber, a cylindrical wall which surrounds the first-named walls in spaced relation thereto to provide a discharge passage for gases issuing from the turbine wheel buckets, gas directing vanes in said discharge passage having transverse passages which communicate with said cooling air chamber, means for effecting flow of cooling air through said cooling air chamber and said transverse passages, and means defining a passage for discharging cooling air from said cooling air chamber against the wheel.

3. The combination with a turbo-supercharger gas turbine wheel comprising a disk with buckets thereon for mounting on an aircraft in a position such that the slip stream of the aircraft flows transversely across it, of cooling and protecting means therefor comprising spaced walls which form a shield for the disk of the wheel and provide a cooling air chamber, a cylindrical wall which surrounds the first-named walls in spaced relation thereto and is curved in the direction of slip stream flow to provide a discharge passage for directing gases issuing from the turbine wheel across said cooling and protecting means in a direction parallel to the plane of the wheel into the slip stream, said cylindrical wall being of relatively small axial depth and covering only a minor portion of the bucket ring, and gas directing vanes in said discharge passage.

DAVID R. SHOULTS.